United States Patent [19]

Kankaanpaa

[11] 3,739,678

[45] June 19, 1973

[54] POWER SAW GUIDE ATTACHMENT

[75] Inventor: Arvo M. Kankaanpaa, Elmont, N.Y.

[73] Assignee: Raymond Lee Organization, Inc., New York, N.Y. ; a part interest

[22] Filed: Feb. 29, 1972

[21] Appl. No.: 230,328

[52] U.S. Cl. ............................... 83/745, 83/471.3
[51] Int. Cl. ............................................. B27b 9/04
[58] Field of Search ...................... 83/471.3, 471.2, 83/745; 30/373, 372, 371, 374, 375, 376; 143/6 G

[56] References Cited
UNITED STATES PATENTS
2,876,808  3/1959  Lindhein ............................ 83/471.3
2,773,523  12/1956  Hopla ................................... 83/745

Primary Examiner—Donald R. Schran
Attorney—Howard I. Podell

[57] ABSTRACT

A guide for a portable power saw, attachable to such a saw, which enables the operator to make straight cuts with said power saw at a uniform angle to the sides of the work being sawed. A fixed bearing member of the guide is attached to the portable power saw, with a slidable mating member fitting into said bearing member, said slidable mating member being equipped with a rotatable end stop for alignment with the work being sawed. The rotatable end stop may be locked in place by means of a screw fastener, and the angle of said stop member to the plane of the saw cut is displayed on a protractor scale fixed to the sliding member.

3 Claims, 3 Drawing Figures

Patented June 19, 1973  3,739,678
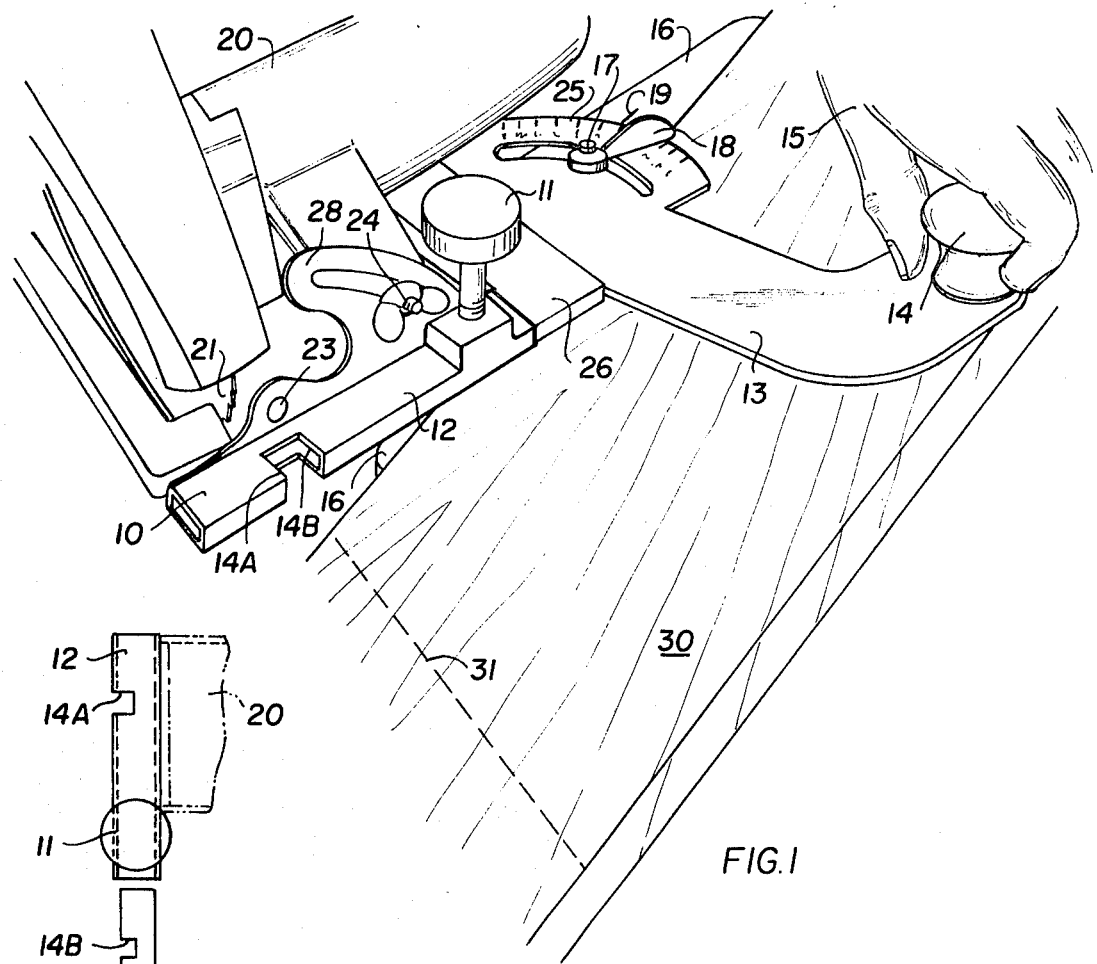
FIG.1
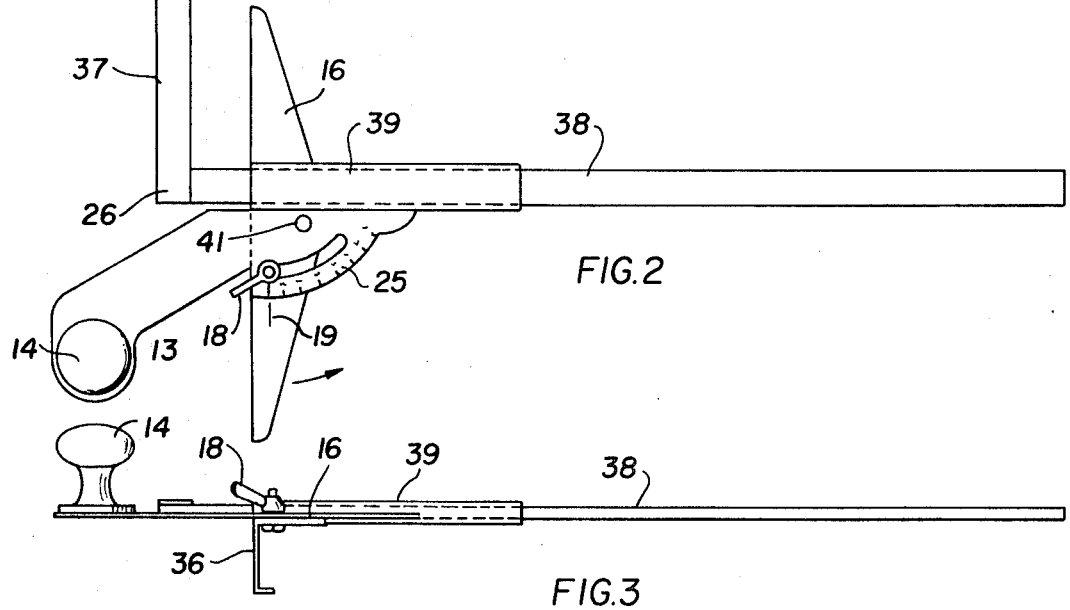
FIG.2
FIG.3

POWER SAW GUIDE ATTACHMENT

SUMMARY OF THE INVENTION

This invention relates to an attachable guide for a hand operated portable power saw, said guide permitting the use of the power saw to make uniform straight cuts at any desired angle to the edges of the work being sawed.

An advantage of this invention is that it may be readily attached to a conventional portable rotary power saw, enabling the operator of said saw to make uniformly straight cuts of the accuracy usually associated with fixed saw tables.

A further advantage of this invention is its relative light weight and the simplicity of attachment and of operation.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of the device attached to a portable power saw;

FIG. 2 is a plan view of the device and its attachment member; and

FIG. 3 is a side view of the device.

DESCRIPTION OF THE PREFERRED EMBODIMENT

Turning now descriptively to the drawing, in which similar reference characters denote similar elements throughout the several views, FIG. 1 illustrates the device 10 attached to power saw 20 and set to cut along diagonal line 31 of wooden board 30.

As shown in FIG. 1–3, mounting section 12 of hollow rectangular tubing is fastened to the power saw 20 with rectangular arms member 37 of guide frame 26 being adaptable to fitting in the interior of mounting section 12 and being fastened in position by the tightening of knobbed threaded fastener 11. When the mounting section 12 and the guide frame 26 are fastened together, matching slot 14A of the mounting section 12 and slot 14B of arm member 37 are aligned and indicate the immediate area in front of the cutting saw blade 21 and the path 31 the saw blade 21 will travel, as arm 38 of guide frame 26 slides inside of slide member 39. Slide member 39 is pivotably mounted to stop member 16, flange 36 of which is manually held against one surface of the board 30 being cut.

Stop member 16 rotates about flush rivet 41 and is fixed in angular relation with slide member 39 by tightening of wing nut 18. The marked scale 25 and guide line 19 indicate the angular relation between the stop member 16 and the path of travel 31.

Right angle flange 36 of stop member 16 is adaptable to bearing against the edge of the board 30 being sawed.

In use, the pressure of hand 15 on knob 14, which is fastened to extension arm 13 of slide member 39, holds stop member 16 and flange surface 36 against the edge of the board 30 being sawed, while the operator guides the power saw unit 20. The direction of motion of the power saw 20 is limited by the linear sliding relation of arm 38 of guide frame 26 riding inside of slide member 39.

The power saw frame 20 may also have a conventional adjustment mechanism for tilting the saw blade 21 with relation to the vertical plane, such tilt setting being fastened in place by tightening wing nut 24 against the slotted frame 28 which pivots about fastener 23 attached to the body of the saw 20.

Since obvious changes may be made in the specific embodiment of the invention described herein, it is indicated that all matter contained herein is intended as illustrative and not as limiting in scope.

Having thus described my invention, what I claim as new and deSire to secure by Letters Patent of the United States is:

1. A guide apparatus for attachment to a portable power rotary saw which enables said saw to travel in a straight line at a uniform angular relation to an edge of the work being cut, with provisions for adjusting and setting of said angle consisting of an attachment member adaptable for fastening in a rigid manner to the power saw frame in front of the saw cutting edge, said attachment member being of the general shape of a hollow rectangular tube, together with a guide arm assembly which has a protruding rectangular bar that fits in mating engagement inside of the rectangular hollow of said attachment member, said attachment member having threaded means to rigidly fasten to the bar of the guide arm assembly inserted inside of the hollow of the attachment member, said guide arm assembly having sliding means linked to a stop member which is adaptable to resting against one edge of a board to be sawed, the linkage of said stop member to said sliding means being adaptable to angular adjustment, such that, in the fully assembled condition to a power saw, the sliding means permit the linear motion of the power saw in one fixed direction relative to the linked stop member.

2. The combination recited in claim 1 in which a recess is located in the attachment member and in the mating bar of the guide arm assembly, said recess being located directly in front of the cutting edge of the saw blade so as to permit viewing by the operator of a portion of the cutting path of the saw blade, ahead of the saw blade, which lies under the guide arm assembly.

3. The combination recited in claim 1 in which the bar of the guide arm assembly is rigidly mounted at right angles to a slide bar which slides inside of the sliding means of the guide arm assembly, the direction of said sliding being at right angles to the axis of the bar.

* * * * *